United States Patent Office 2,878,270
Patented Mar. 17, 1959

2,878,270

POWDERING OF NATURAL WAXES

Carl J. Ish, Columbus, Ohio, assignor, by mesne assignments, to Pennsalt Chemicals Corporation, a corporation of Pennsylvania No Drawing. Application December 30, 1955
Serial No. 556,389

8 Claims. (Cl. 260—398)

This invention relates to the powdering of natural waxes by chemical means. More particularly, this invention relates to the treatment of the waxes with anhydrous hydrogen fluoride to yield the wax in a powdered and more friable form.

By means of this invention, it is possible to dispense completely or in part with mechanical pulverization of certain natural waxes. This invention is based upon the discovery that the treatment of certain natural waxes, as hereinafter defined, with anhydrous hydrogen fluoride reduces the wax to a powder or friable particles which easily crumble to more finely divided particles. The term "anhydrous" in reference to hydrogen fluoride is used not only in its absolute technical sense, but is used herein also as in the trade to describe hydrogen fluoride which may contain small amounts, up to about 5 percent, of water. Among the advantages of this invention is the ease by which these waxes can be powdered, thereby facilitating the handling and processing of the waxes for such uses as in leather dressings, polishes, sizings, adhesives, and other uses of waxes. The action of the hydrogen fluoride on the waxes is not understood, but apparently the waxes remain chemically unaltered after the treatment with hydrogen fluoride. The treated waxes, after melting, form a coalescent mass upon cooling physically similar in appearance to the waxes before treatment with the hydrogen fluoride. The melting points of the powdered waxes indicate that the waxes are chemically unaltered.

The natural waxes are classifiable in three groups: animal waxes, vegetable waxes, and mineral waxes. The animal and vegetable waxes are comprised essentially of a group of fatty substances composed, for the most part, of esters of high-molecular-weight n-aliphatic primary alcohols and fatty acids, the same acids and alcohols occurring also in the free state, and varying small amounts of hydrocarbons. Waxes are chemically differentiated over fats and oils by the lack or substantial lack of glycerol as the alcoholic component. Generally, the wax esters are comprised of the fatty acid esters of high-molecular-weight aliphatic primary alcohols. The mineral waxes are further classifiable into hydrocarbon waxes and ester waxes. The hydrocarbon mineral waxes consist of a mixture of solid, saturated aliphatic hydrocarbons composed chiefly of n-, iso-, and cycloparaffins. The principal sources of the hydrocarbon mineral waxes are from petroleum and ozokerite. The ester mineral waxes, as the name implies, consists chiefly of wax esters and relatively smaller amounts of paraffinic hydrocarbons, as compared to the hydrocarbon mineral waxes. The wax esters of the ester mineral waxes are similar to the wax esters in the animal and vegetable waxes in that they consist, for the most part, of esters of high-molecular-weight n-aliphatic primary alcohols and n-aliphatic fatty acids. The natural waxes which can be powdered in accordance with this invention by the treatment with anhydrous hydrogen fluoride are the animal waxes, vegetable waxes and the ester mineral waxes. In contrast therewith, the anhydrous hydrogen fluoride does not affect the hydrocarbon mineral waxes (that is, the predominantly paraffinic hydrocarbon waxes) in this manner.

The following examples are illustrative of the invention:

*Example I*

Approximately equal parts of beeswax and anhydrous hydrogen fluoride were stirred together. The beeswax was partly soluble in the anhydrous hydrogen fluoride, forming an emulsion with the hydrogen fluoride. The hydrogen fluoride was vaporized from the mixture, leaving a residue consisting of finely powdered wax and larger friable particles of wax which easily crumbled to a fine powder.

*Example II*

Approximately equal parts of carnauba wax and anhydrous hydrogen fluoride were mixed together, forming a milky suspension. The anhydrous hydrogen fluoride was removed from the mixture by vaporization at room temperature. The wax was changed to a finely divided powdered wax.

*Example III*

Equal parts of sugarcane wax and anhydrous hydrogen fluoride were mixed together. The sugarcane wax was partly soluble in the anhydrous hydrogen fluoride, forming an amber-colored liquid. A soft, easily powdered wax remained after vaporization of the anhydrous hydrogen fluoride.

*Example IV*

Equal parts of candelilla wax and anhydrous hydrogen fluoride were mixed together. The candelilla wax was partly soluble in the anhydrous hydrogen fluoride, forming a purple-colored emulsion. A powdered wax remained after vaporization of the anhydrous hydrogen at room temperature.

*Example V*

Equal parts of montan wax and anhydrous hydrogen fluoride were mixed together. The montan wax appeared partly soluble in the hydrogen fluoride, forming a black-colored liquid. The anhydrous hydrogen fluoride was vaporized from the mixture at room temperature, yielding a powdered wax.

*Example VI*

Equal parts of ceresine wax and anhydrous hydrogen fluoride were mixed together. The ceresine wax appeared slightly soluble in the anhydrous hydrogen fluoride. The anhydrous hydrogen fluoride was vaporized from the mixture at room temperature. This treatment with anhydrous hydrogen fluoride did not yield a powdered wax. The ceresine wax is a hydrocarbon mineral wax consisting predominantly of a mixture of n-, iso-, and cycloparaffinic hydrocarbons.

Most complete powdering of the animal waxes, vegetable waxes, and ester mineral waxes can be obtained by agitation of the mixture, such as by stirring, during removal of the anhydrous hydrogen fluoride. Without agitation, particles of larger size may be present in the powdered mass after the treatment with anhydrous hydrogen fluoride. However, these larger particles are highly friable and quickly disintegrate into smaller powderlike particles.

The melting points of the waxes before treatment and after treatment with the anhydrous hydrogen fluoride indicate that the treatment does not chemically alter the waxes. The following table shows that the melting points of the waxes are substantially the same before treatment and after treatment:

| Waxes | Melting Point Before Treatment, ° C. | Melting Point After Treatment, ° C. |
|---|---|---|
| Carnauba | 80–82 | 80–82 |
| Montan | 68–70 | 69–71 |

After melting of the powdered waxes, the waxes form a coalescent body similar in appearance to the waxes before powdering by means of this treatment with anhydrous hydrogen fluoride, except that the waxes are slightly darker in color.

Various techniques may be used for the removal of the anhydrous hydrogen fluoride from the mixture of anhydrous hydrogen fluoride and the wax. Obviously, the low boiling point of the anhydrous hydrogen fluoride make it preferable to remove the anhydrous hydrogen fluoride by means of vaporization at room temperature. However, the hydrogen fluoride may be distilled at elevated temperatures but below the temperature of the softening or melting points of the wax. Further, removal of the anhydrous hydrogen fluoride may be facilitated by removal thereof under conditions of partial pressure or partial pressure and elevated temperatures. In addition, the hydrogen fluoride may be removed by means of water washing techniques.

The above description and examples have been given for illustration of the invention and not for the purpose of limiting the invention specifically to the disclosure therein. Many modifications and variations of the invention as hereinbefore set forth may be made without departing from the spirit and scope thereof. Therefore, only such limitations should be imposed as are indicated in the following claims.

What is claimed is:

1. The method of powdering natural waxes comprising treating the wax to the action of anhydrous hydrogen fluoride and removing the anhydrous hydrogen fluoride therefrom at a temperature below the melting point of the wax to yield a powdered friable wax, said natural wax selected from the group consisting of animal waxes, vegetable waxes, and ester mineral waxes.

2. The method of powdering natural waxes comprising treating the wax to the action of anhydrous hydrogen fluoride and vaporizing the anhydrous hydrogen fluoride therefrom at a temperature below the melting point of the wax to yield a powdered wax, said natural waxes selected from the group consisting of animal waxes, vegetable waxes, and ester mineral waxes.

3. The method of powdering animal wax comprising treating the wax to the action of anhydrous hydrogen fluoride and removing the anhydrous hydrogen fluoride therefrom at a temperature below the melting point of the wax to yield powdered wax.

4. The method of powdering vegetable wax comprising treating the vegetable wax to the action of anhydrous hydrogen fluoride at a temperature below the melting point of the wax and removing the anhydrous hydrogen fluoride to yield powdered wax.

5. The method of powdering ester mineral waxes comprising treating the wax to the action of anhydrous hydrogen fluoride and removing the anhydrous hydrogen fluoride at a temperature below the melting point of the wax to yield powdered wax.

6. The method of powdering carnauba wax comprising treating the wax to the action of anhydrous hydrogen fluoride and removing the anhydrous hydrogen fluoride by vaporization therefrom at a temperature below the melting point of the wax.

7. The method of powdering beeswax comprising treating the beeswax to the action of anhydrous hydrogen fluoride and vaporizing the anhydrous hydrogen fluoride therefrom at a temperature below the melting point of the wax.

8. The method of powdering montan wax comprising treating the montan wax to the action of anhydrous hydrogen fluoride and vaporizing the anhydrous hydrogen fluoride therefrom at a temperature below the melting point of the wax.

References Cited in the file of this patent

UNITED STATES PATENTS

| | | |
|---|---|---|
| 2,406,336 | Auer | Aug. 27, 1946 |
| 2,531,785 | Pressing et al. | Nov. 28, 1950 |
| 2,540,978 | Buckman | Feb. 6, 1951 |

FOREIGN PATENTS

| | | |
|---|---|---|
| 697,572 | France | Jan. 20, 1931 |

UNITED STATES PATENT OFFICE
CERTIFICATE OF CORRECTION

Patent No. 2,878,270                                       March 17, 1959

Carl J. Ish

It is hereby certified that error appears in the printed specification of the above numbered patent requiring correction and that the said Letters Patent should read as corrected below.

Column 2, line 2, for "mneral" read -- mineral --; column 4, lines 15 to 17 should appear as shown below instead of as in the patent:

> hydrogen fluoride and removing the anhydrous hydrogen fluoride at a temperature below the melting point of the wax to yield powdered wax.

Signed and sealed this 28th day of July 1959.

(SEAL)
Attest:
KARL H. AXLINE

Attesting Officer

ROBERT C. WATSON
Commissioner of Patents